(12) United States Patent
Yu et al.

(10) Patent No.: US 11,668,877 B2
(45) Date of Patent: Jun. 6, 2023

(54) INTERFACE FOR OPTICAL COMMUNICATION USING ADIABATIC COUPLING AND OPTICAL FIBER TAPER MANUFACTURING METHOD

(71) Applicant: Korea Advanced Institute of Science and Technology, Daejeon (KR)

(72) Inventors: Kyoungsik Yu, Daejeon (KR); Gyeongho Son, Daejeon (KR); Youngjae Jeong, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 15 days.

(21) Appl. No.: 17/400,332

(22) Filed: Aug. 12, 2021

(65) Prior Publication Data

US 2022/0334316 A1    Oct. 20, 2022

(30) Foreign Application Priority Data

Apr. 15, 2021   (KR) .................. 10-2021-0049439

(51) Int. Cl.
*G02B 6/30* (2006.01)

(52) U.S. Cl.
CPC .................. *G02B 6/305* (2013.01)

(58) Field of Classification Search
CPC ...... G02B 6/02004; G02B 6/25; G02B 6/305; G02B 6/262
See application file for complete search history.

(56) References Cited

U.S. PATENT DOCUMENTS 10,488,596 B2 *  11/2019  Akiyama ............... G02B 6/305

FOREIGN PATENT DOCUMENTS

KR            20190048129 A  *  5/2019

\* cited by examiner

*Primary Examiner* — Michael P Mooney
(74) *Attorney, Agent, or Firm* — Maier & Maier, PLLC

(57) ABSTRACT

An interface for optical communication, including an input waveguide in which light input from an outside is guided, an output waveguide including a first part abutting against one end of the input waveguide and a second part connected to the first part and a substrate including a Buried oxide (BOX) layer connected to a lower side of the output waveguide, wherein the one end of the input waveguide includes a tapered structure of which a cross-sectional area is reduced by a predetermined angle.

7 Claims, 17 Drawing Sheets

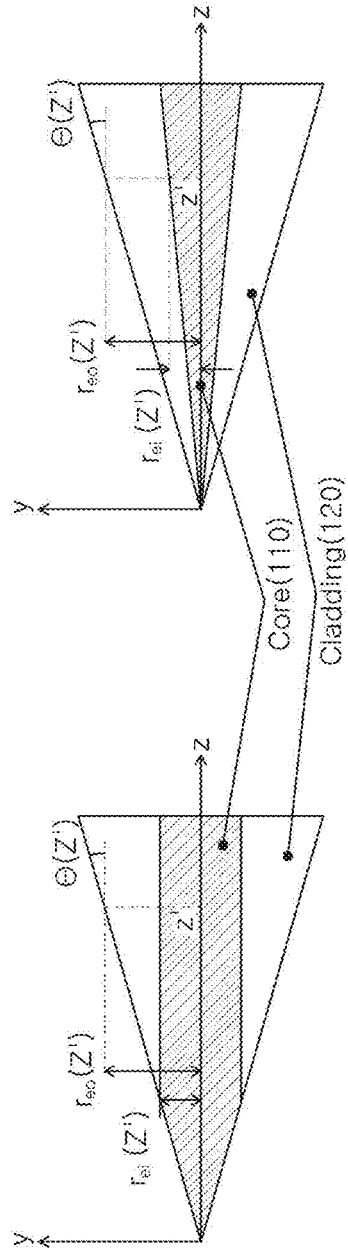

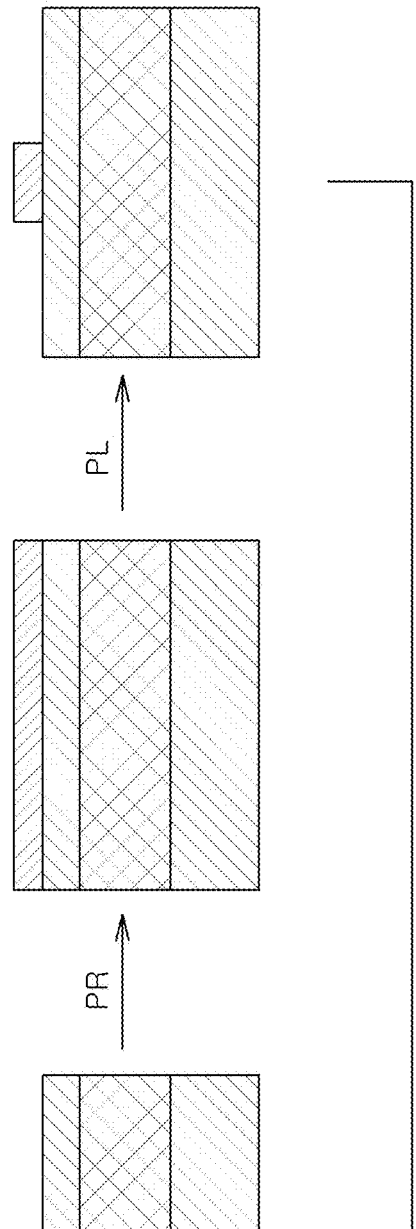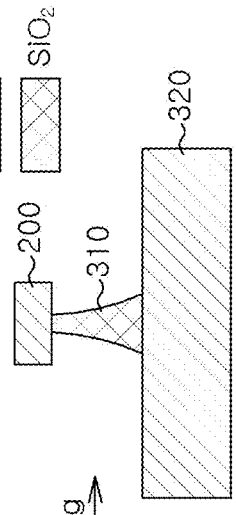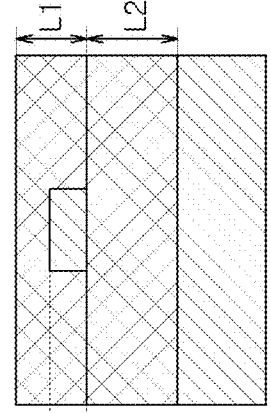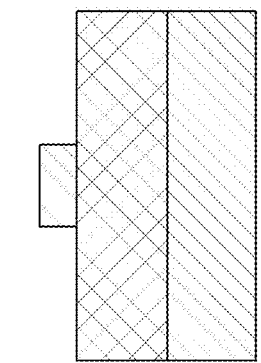

*FIG.10A*     *FIG.10B*
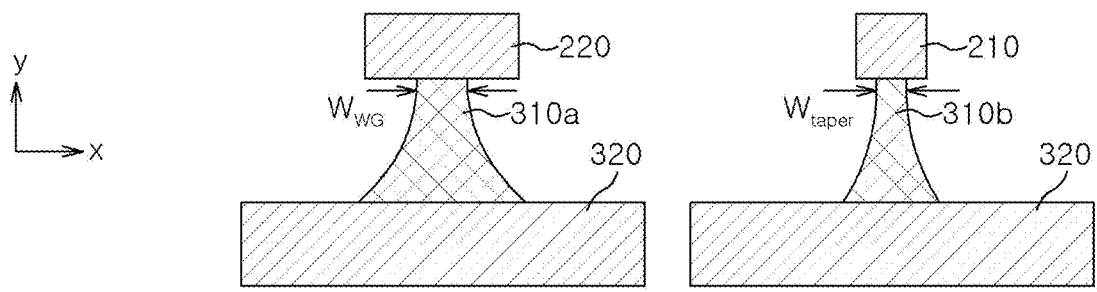
*FIG.10C*
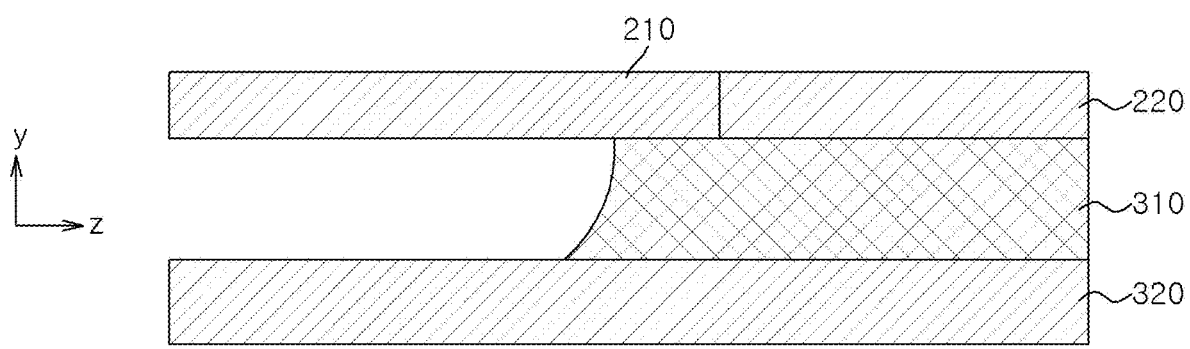

6:35

6:40

6:45

6:50

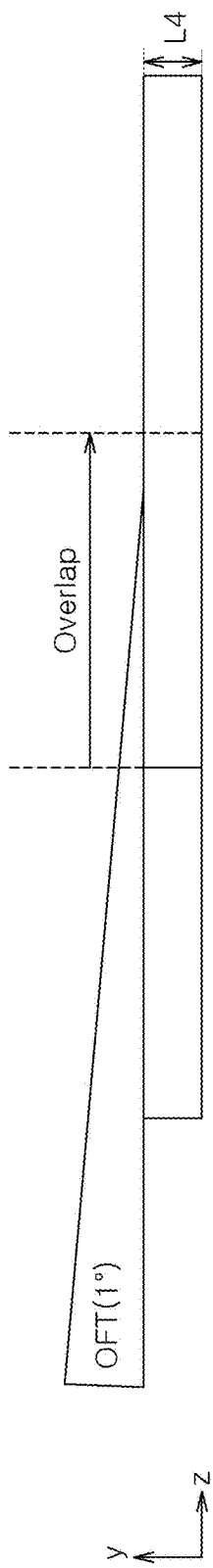
FIG. 14A
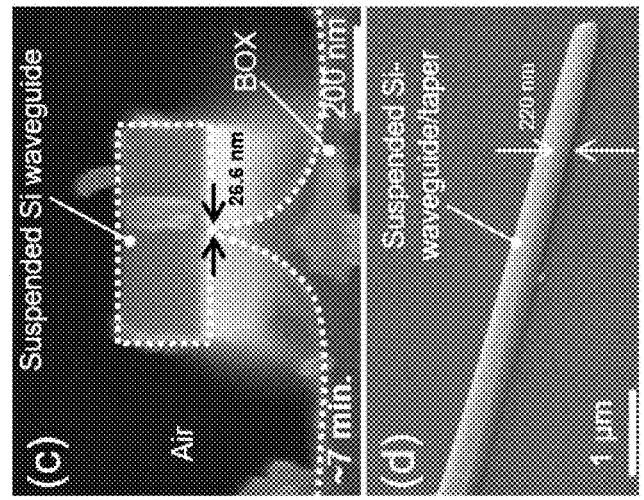
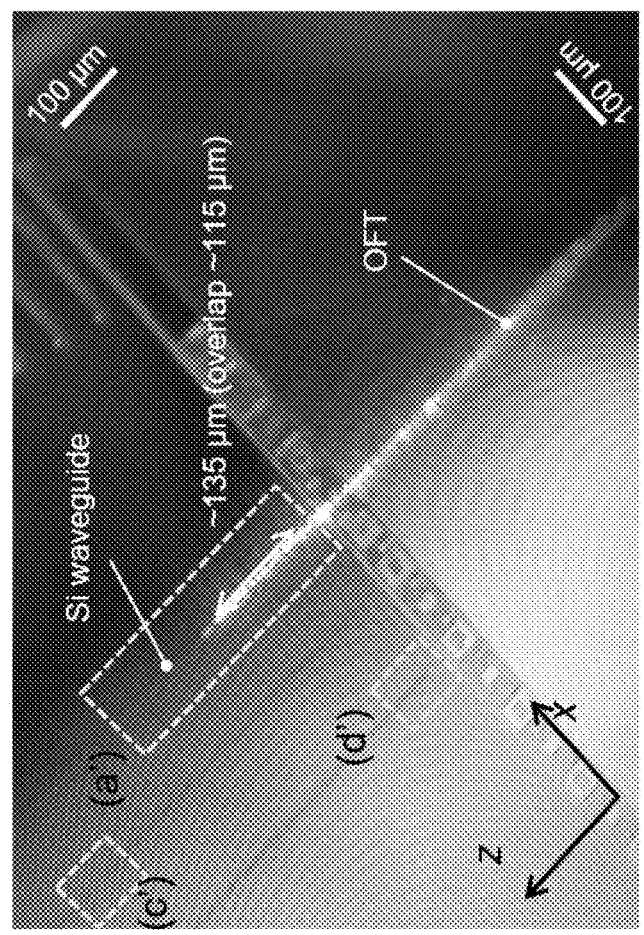
FIG. 14B

INTERFACE FOR OPTICAL COMMUNICATION USING ADIABATIC COUPLING AND OPTICAL FIBER TAPER MANUFACTURING METHOD

CROSS-REFERENCE TO RELATED APPLICATION

This application claims priority to Korean Patent Application No. 10-2021-0049439, filed on Apr. 15, 2021. The entire contents of the application on which the priority is based are incorporated herein by reference.

TECHNICAL FIELD

The present disclosure relates to an interface for optical communication and an optical fiber taper manufacturing method for efficient light transmission between an input waveguide and an output waveguide.

BACKGROUND

Energy transfer based on an optical fiber taper (OFT) and an evanescent field is a very essential element for efficient light transmission between two separate waveguides with very large differences in the refractive index and mode size. An optical coupling using such an evanescent field uses the fact that, in a waveguide having a size of a wavelength or less, most of the light energy is distributed outside the waveguide.

As described above, the OFT has been attracting attention from many researchers in recent years because of its wide range of use and high potential for application. Among them, since an OFT showing an adiabatic property can significantly contribute to the waveguide of the integrated circuit, a lot of effort is required to manufacture a very sharp adiabatic OFT. In order to manufacture such an OFT, a heating-and-pulling method is very actively used, but a method capable of uniformly mass-producing the sharp OFT has been insufficient so far.

SUMMARY

The present disclosure has an object to provide a novel optical fiber taper (OFT) manufacturing method of mass-producing a very sharp OFT using chemical etching.

In addition, the present disclosure has another object to provide a method of manufacturing a silicon waveguide/taper floating in the air in order to efficiently transmit light from the manufactured OFT to the silicon waveguide.

In accordance with an aspect of the present disclosure, there is provided an interface for optical communication including, an input waveguide in which light input from an outside is guided, an output waveguide including a first part abutting against one end of the input waveguide and a second part connected to the first part and a substrate including a Buried oxide (BOX) layer connected to a lower side of the output waveguide, wherein the one end of the input waveguide includes a tapered structure of which a cross-sectional area is reduced by a predetermined angle.

In accordance with another aspect of the present disclosure, there is provided a method of manufacturing an optical fiber taper (OFT), the method including, immersing an optical fiber including a core and a cladding of which an outside is covered with a polymer jacket into a solution including hydrofluoric acid (HF) and removing the optical fiber from the solution after a predetermined time, wherein an end of the optical fiber removed from the solution after the predetermined time includes a conic structure of which a cross-sectional area is reduced by a predetermined angle.

As described above, according to embodiments of the present disclosure, an OFT having a cone-shaped end of an optical fiber may be manufactured by using the chemical etching using a capillary phenomenon.

In addition, the light may be efficiently transmitted by using the manufactured OFT and a silicon-based integrated waveguide coupler.

BRIEF DESCRIPTION OF THE DRAWINGS

FIGS. 3A, 3B and 3C show a critical angle of the interface 10 for optical communication according to an embodiment of the present disclosure. In FIGS. 3A to 3C, z' means an arbitrary point on a z-axis. Further, rei indicates a radius from the point z' to the core and reo indicates a radius from the point z' to the radius to the cladding. In addition, θ is an angle between the cladding and the z-axis at the point z'.

FIGS. 9A, 9B, 9C, 9D, 9E and 9F show a diagram illustrating a manufacturing process of an interface for optical communication according to an embodiment of the present disclosure.

FIG. 10A shows a diagram illustrating a front view of a Buried oxide (BOX) layer of an interface for optical communication according to an embodiment of the present disclosure.

FIG. 10B shows a diagram illustrating a front view of a Buried oxide (BOX) layer of an interface for optical communication according to an embodiment of the present disclosure.

FIG. 10C shows a diagram illustrating a side view of a Buried oxide (BOX) layer of an interface for optical communication according to an embodiment of the present disclosure.

FIG. 14A shows a diagram illustrating a result of an experiment to predict an OFT of an interface for optical communication and an interface of a PIC according to an embodiment of the present disclosure.

FIG. 14B shows a diagram illustrating a result of an experiment to predict an OFT of an interface for optical communication and an interface of a PIC according to an embodiment of the present disclosure.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
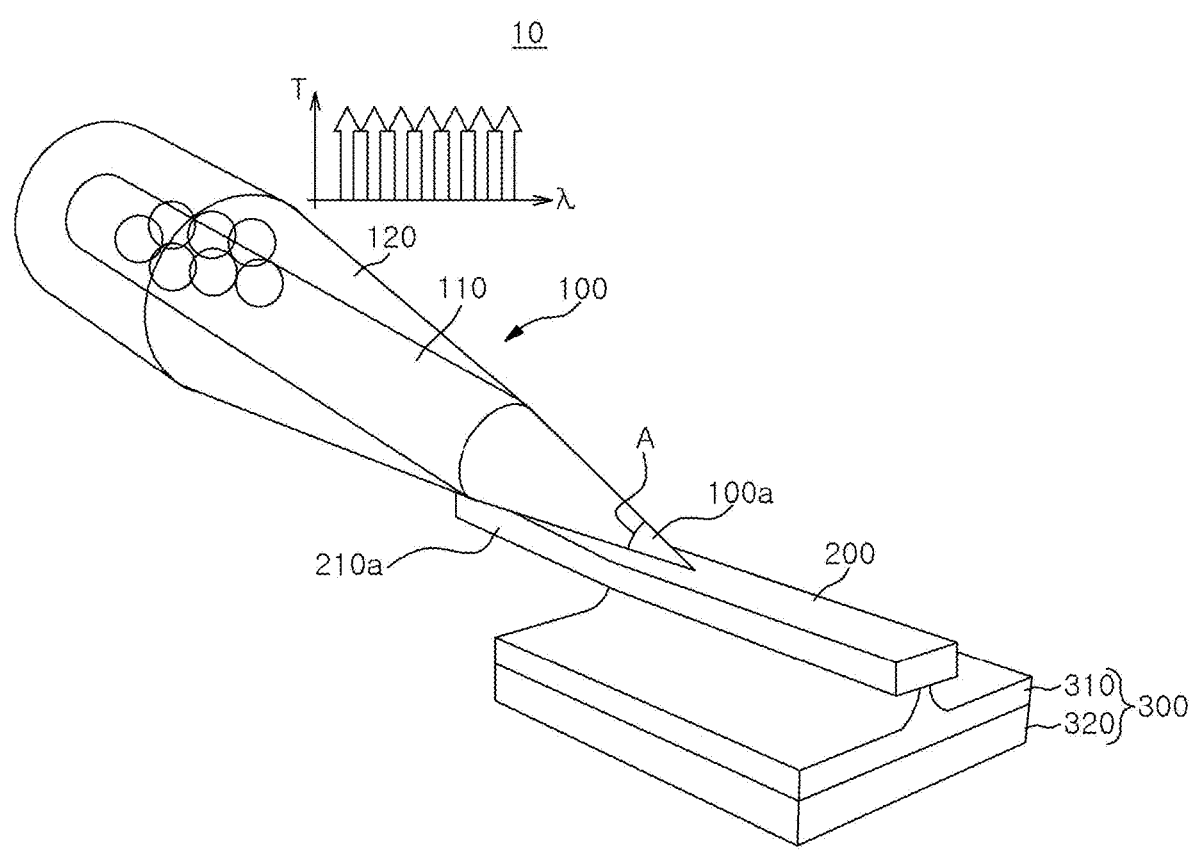
FIG. 1 shows an interface for optical communication according to an embodiment of the present disclosure.
Figure 2:
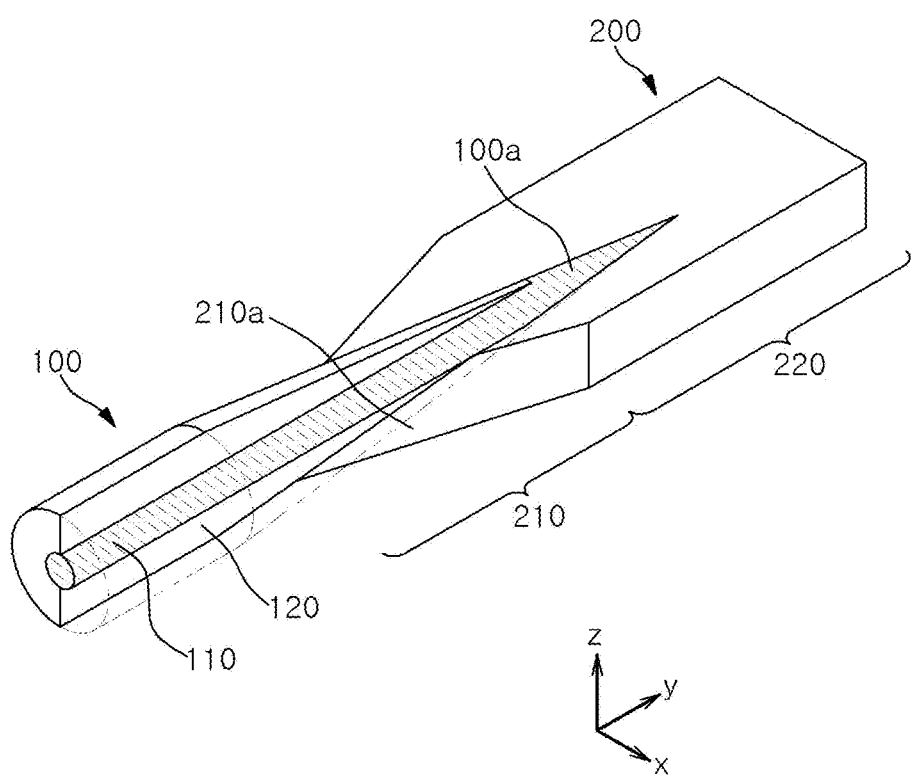
FIG. 2 shows an interface for optical communication according to an embodiment of the present disclosure.

FIGS. 1 and 2 show an interface for optical communication according to an embodiment of the present disclosure.

The interface for optical communication according to an embodiment of the present disclosure is an interface for optical communication capable of reducing an existing extreme loss and providing high efficiency by connecting an SMF-28 of a tapered structure and a silicon integrated waveguide of an inversely-tapered structure.

Figure 4:
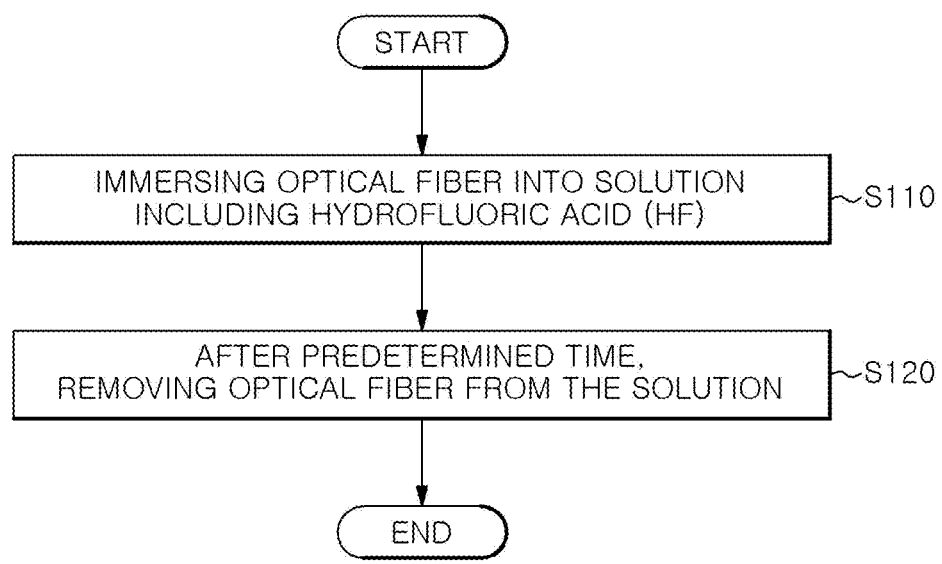
FIG. 4 shows an optical fiber taper (OFT) manufacturing method according to an embodiment of the present disclosure.
Figure 5:
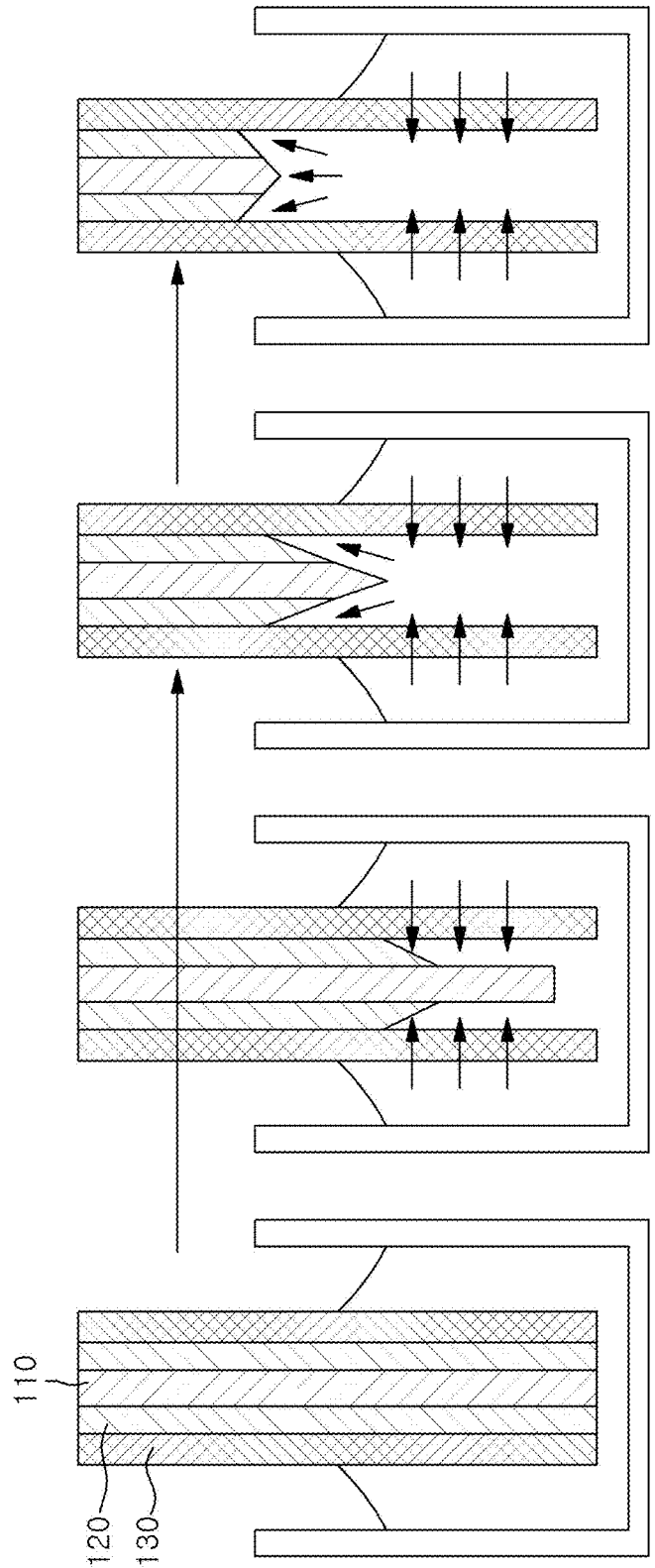
FIGS. 5A, 5B, 5C and 5D show an OFT manufacturing method according to an embodiment of the present disclosure.

In an embodiment of the present disclosure, a very sharp optical fiber taper (OFT) is manufactured by using a capillary phenomenon occurring in a tube as shown in FIGS. 4 and 5 below. Specifically, it is manufactured to satisfy adiabaticity in order to efficiently convert the light of an $HE_{11}$ mode confined in an optical fiber into an evanescent wave. In addition, in order to efficiently transmit the light from the manufactured OFT to the silicon waveguide, a silicon waveguide/taper floating in the air is manufactured as shown in FIG. 9 below.

Referring to FIGS. 1 and 2, an interface 10 for optical communication according to an embodiment of the present disclosure includes an input waveguide 100, an output waveguide 200, and a substrate 300.

The input waveguide 100 guides light input from the outside.

The input waveguide 100 may include a core 110 and a cladding 120. The core 110 may provide a space through which the light may be guided inside the input waveguide 100. The cladding 120 may be disposed to surround the core 110. The cladding 120 may have a refractive index lower than that of the core 110 so that the light moves in a waveguide direction of the light through a total reflection phenomenon inside the core 110. For example, the refractive index of the core 110 may be 1.4504, and the refractive index of the cladding 120 may be 1.4447, but are not limited thereto.

Herein, one end 100a of the input waveguide 100 includes a tapered structure of which a cross-sectional area is reduced by a predetermined angle, and for example, the one end 100a of the input waveguide 100 may include a conic structure.

According to an embodiment of the present disclosure, the end 100a of the input waveguide 100 includes a first generatrix and a second generatrix that share one vertex, and the first generatrix and the second generatrix form an angle A of 0.1° through 2°.

Accordingly, since a degree of reduction in a cross-sectional area of the input waveguide 100 along the waveguide direction of the light is small, the light may be transmitted to the output waveguide 200 without changing a mode of the light at the one end 100a of the input waveguide 100.

Herein, the one end 100a of the input waveguide 100 may indicate a part of the input waveguide 100 optically coupled to the output waveguide 200.

In addition, one end 210a of a first part 210 may indicate a part of the first part 210 optically coupled to the input waveguide 100.

The output waveguide 200 may receive the light from the input waveguide 100.

The output waveguide 200 includes the first part 210 abutting against the one end 100a of the input waveguide 100 and a second part 220 connected to the first part 210.

In an embodiment of the present disclosure, the input waveguide 100 may be an optical fiber, and the output waveguide 200 may be a Photonics Integrated Circuit (PIC) including silicon as a material, but are not limited thereto.

A cross-sectional area of the first part 210 of the output waveguide 200 may increase along the waveguide direction of the light and an angle of the one end of the first part 210 is formed to be 1° to 3°. Accordingly, since a degree of reduction in the cross-sectional area of the first part 210 along the waveguide direction of the light is small, the mode of the light may not be changed when the light is transmitted from the input waveguide 100 to the output waveguide 200.

In other words, the cross-sectional area of the one end 100a of the input waveguide 100 and the cross-sectional area of the one end of the first part 210 are gently changed along the waveguide direction of the light, so that the mode of the light of the input waveguide 100 may be maintained to be the same in the output waveguide 200.

The substrate 300 includes a Buried oxide (BOX) layer 310 connected to the lower side of the output waveguide 200 and a Si substrate 320 positioned under the BOX layer 310.

Specifically, the output waveguide 200 is in the form of floating above the Si substrate 320, the BOX layer 310 is positioned therebetween, and a width of the BOX layer 310 may be formed to be narrower than the width of the output waveguide 200.

Herein, at least a part of the output waveguide 200 is formed by a material including the silicon.

Referring to FIG. 2, the cross-sectional area of the first part 210 of the output waveguide 200 increases along the waveguide direction of the light transmitted from the input waveguide 100, and the cross-sectional area of the second part 220 is constant along the waveguide direction of the light transmitted from the input waveguide 100.

Hereinafter, the waveguide direction of the light may indicate a direction of an average flow of the light traveling in a direction parallel to a direction from the input waveguide 100 to the output waveguide 200 (for example, a y-axis direction in FIG. 2.) Unless otherwise described, the corresponding expression may be used equally in the following.

In an embodiment, the one end 100a of the input waveguide 100 is disposed to cover at least a part of the output waveguide 200, so that the input waveguide 100 and the output waveguide 200 may form an optical coupling. For example, the input waveguide 100 and the output waveguide 200 may form an adiabatic coupling.

The adiabatic coupling indicates a coupling method in which the light may be transmitted from the input waveguide 100 to the output waveguide 200 through an evanescent coupling. Specifically, the adiabatic coupling is a coupling method that changes the cross-sectional areas of the input waveguide 100 and the output waveguide 200 along the waveguide direction of the light, thereby maintaining the mode of the light of the input waveguide 100 to be the same in the output waveguide 200. Light transmission efficiency of the adiabatic coupling may increase as the cross-sectional areas of the input waveguide 100 and the output waveguide 200 are gently changed along the waveguide direction of the light.

Figure 3C:
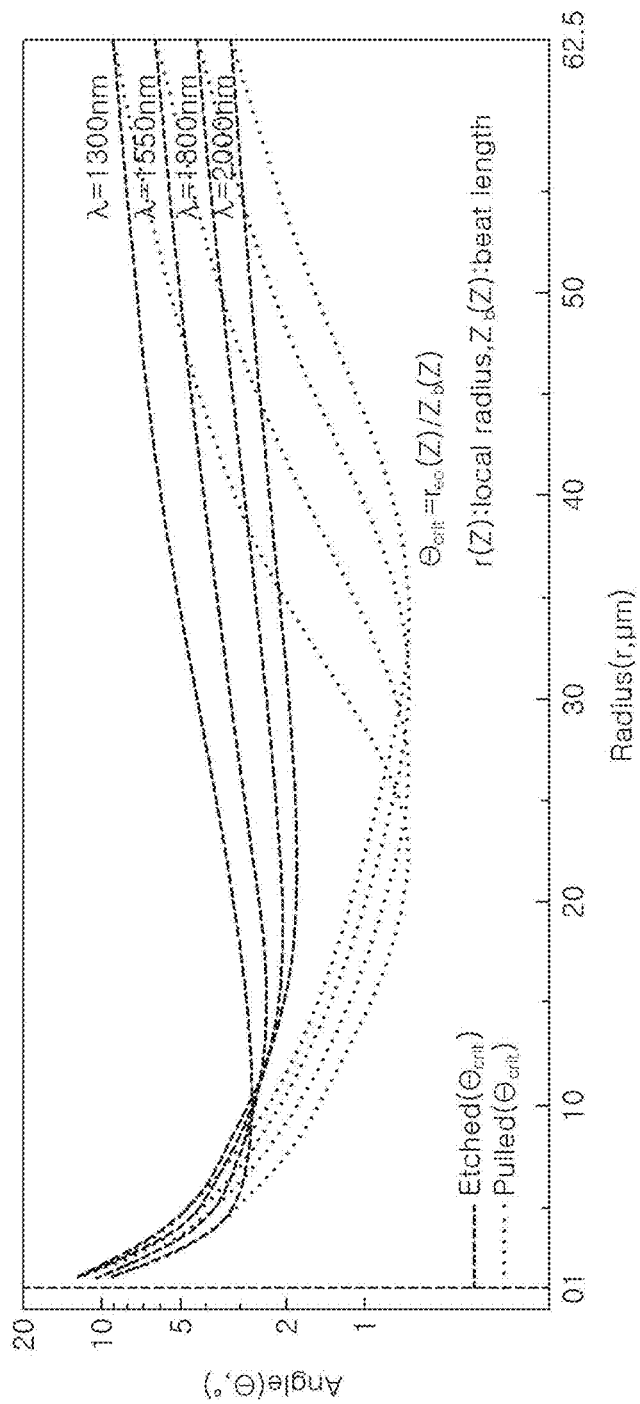

FIGS. 3A, 3B and 3C show a critical angle of the interface 10 for optical communication according to an embodiment of the present disclosure.

FIG. 3A shows an OFT according to an embodiment of the present disclosure, and FIG. 3B shows a conventional OFT.

In the case of an etched fiber according to an embodiment of the present disclosure, the core 110 inside the cladding 120 is maintained. When the critical angle, which is a criterion of adiabaticity, is calculated by using this structure, it may be drawn as in a graph shown in FIG. 3C.

In the case of the core-maintained OFT, since a core of a high refractive index is maintained more than that of a pulled fiber, an $HE_{11}$ mode is more distinguishable from an $HE_{12}$ mode, and thus it may be seen that the critical angle is relatively large in wavelength ranges from 1300 nm to 1800 nm.

An OFT positioned below the critical angle in the graph may be referred to as an adiabatic OFT, and it may be seen that an applied fundamental $HE_{11}$ proceeds well to an end without loss.

In addition, it may be easy to manufacture the OFT in which the etched core is maintained because a critical angle condition is relatively less demanding, and an adiabatic evolution condition is relaxed.

FIGS. 4 and 5 show an OFT manufacturing method according to an embodiment of the present disclosure.

FIG. 4 shows a flowchart illustrating the OFT manufacturing method according to an embodiment of the present disclosure.

When the input waveguide 100 is an optical fiber, methods of manufacturing an optical fiber of which one end has an angle of 0.1° to 2° include a method of physically abrading the optical fiber, a method of stretching the optical fiber by applying heat to the optical fiber, and the like. However, since these methods have a disadvantage that the quality of the manufactured optical fiber is not uniform or poor, a new method is used for manufacturing the optical fiber for an efficient adiabatic coupling.

Referring to FIG. 4, in a step S110, an optical fiber including the core 110 and the cladding 120 of which an outside is covered with a polymer jacket is immersed in a solution including hydrofluoric acid (HF).

Herein, the solution including the HF may have a concentration of 40% to 50%.

If the concentration of the solution including the HF is less than 40%, it is difficult to manufacture a taper because chemical etching is difficult.

In a step S120, after a predetermined time, the optical fiber is removed from the solution.

According to an embodiment of the present disclosure, the predetermined time may be 70 to 75 minutes.

Herein, an end of the optical fiber removed from the solution after the predetermined time includes a conic structure of which a cross-sectional area is reduced by a predetermined angle.

Specifically, the end of the optical fiber removed from the solution includes a first generatrix and a second generatrix that share one vertex, and the first generatrix and the second generatrix form an angle of 0.1° to 2°.

More specifically described with reference to FIG. 5 below, a commercial optical fiber such as SMF-28 which is generally used in an optical communication C-band may be used as the optical fiber. The core 110 and the cladding 120 of the optical fiber have a radius of about 4.0 μm to 4.3 μm and 60.0 μm to 63.5 μm, respectively.

An outside of the cladding 120 is covered by a polymer jacket 130 and the polymer jacket 130 is a key point of the manufacturing method. A prepared optical fiber strand is immersed in the HF solution having a concentration of 40% to 50%. In this case, a schematic diagram of etching the optical fiber over time is as shown in FIGS. 5A through 5D.

As time passes, the polymer jacket 130 is penetrated and the cladding 120 is removed. At this time, until the core 110 is etched, the core 110 is maintained as shown in FIG. 5B. The etching stops when an end of the optical fiber forms a conic shape between about 70 to 75 minutes as time passes. At this time, the OFT shows a very sharp and an adiabatic property in general.

Herein, the etching proceeds in an etching environment in which a temperature is 23° C. and a humidity is 50%, and etching time may change very sensitively depending on the environment. However, according to an embodiment of the present disclosure, the OFT showing the adiabatic property well may be formed between 70 to 75 minutes.

If etching time is insufficient as shown in FIG. 5B, a cylindrical shape is shown due to insufficient removal of the cladding 120 and the core 110 of the optical fiber.

If the etching time exceeds about 70 to 75 minutes, not only the cladding 120 of the optical fiber but also the core 110 thereof are all removed. At this time, as shown in FIG. 5C, it is a capillary phenomenon occurring between the outer polymer jacket and the optical fiber that plays a key role in changing from the cylinder shape to the conic shape. As a result, the etching takes place more strongly at an edge area of the optical fiber than at a center area of the optical fiber and thus a very sharp shape is shown, so it may be said that the manufacturing result is very advantageous in generating an evanescent field.

However, if the etching process is excessively prolonged, an optical fiber tip is directed above a surface of the solution as shown in FIG. 5D, and as a result, water pressure inside the polymer jacket gradually weakens. As a result, an etching rate of the edge area decreases, and an angle thereof becomes obtuse. In addition, due to low water pressure and prolonged etching time, a surface of OFT becomes rough, the adiabatic property is gradually deteriorated, and scattering loss may be predicted.

Figure 6:
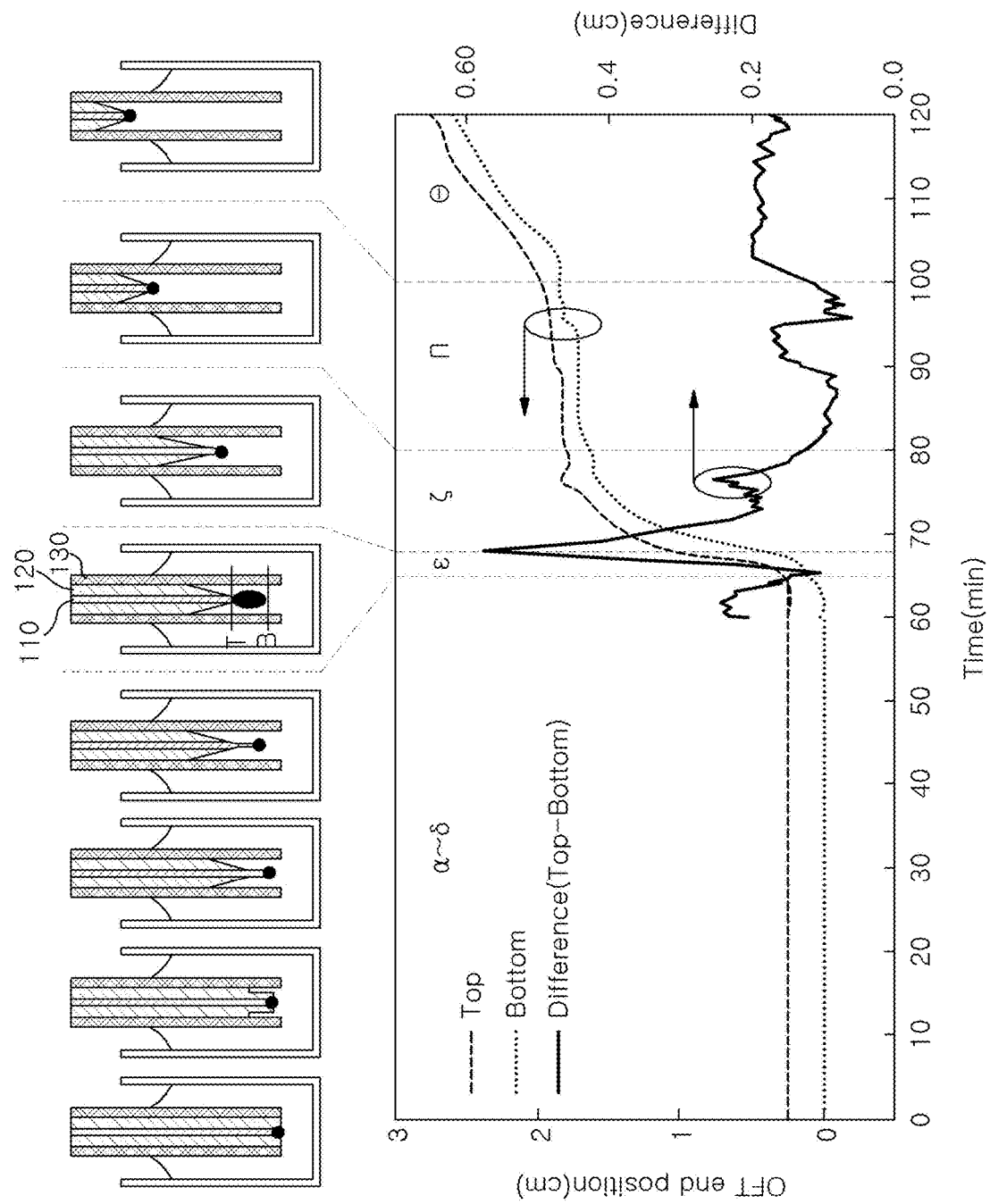
FIG. 6 shows a result of monitoring light scattered according to an OFT manufacturing method according to an embodiment of the present disclosure.

FIG. 6 shows a result of monitoring light scattered according to an OFT manufacturing method according to an embodiment of the present disclosure.

In FIG. 6, as a result of monitoring the scattered light in real time by applying visible light in order to effectively manufacture an adiabatic OFT, it may be seen that a height of the scattered light increases between about 65 to 68 minutes, and the height of the scattered light decreases between about 70 to 80 minutes. Accordingly, it may be identified that the adiabatic OFT is the most optimal in between about 65 to 68 minutes.

Figure 7:
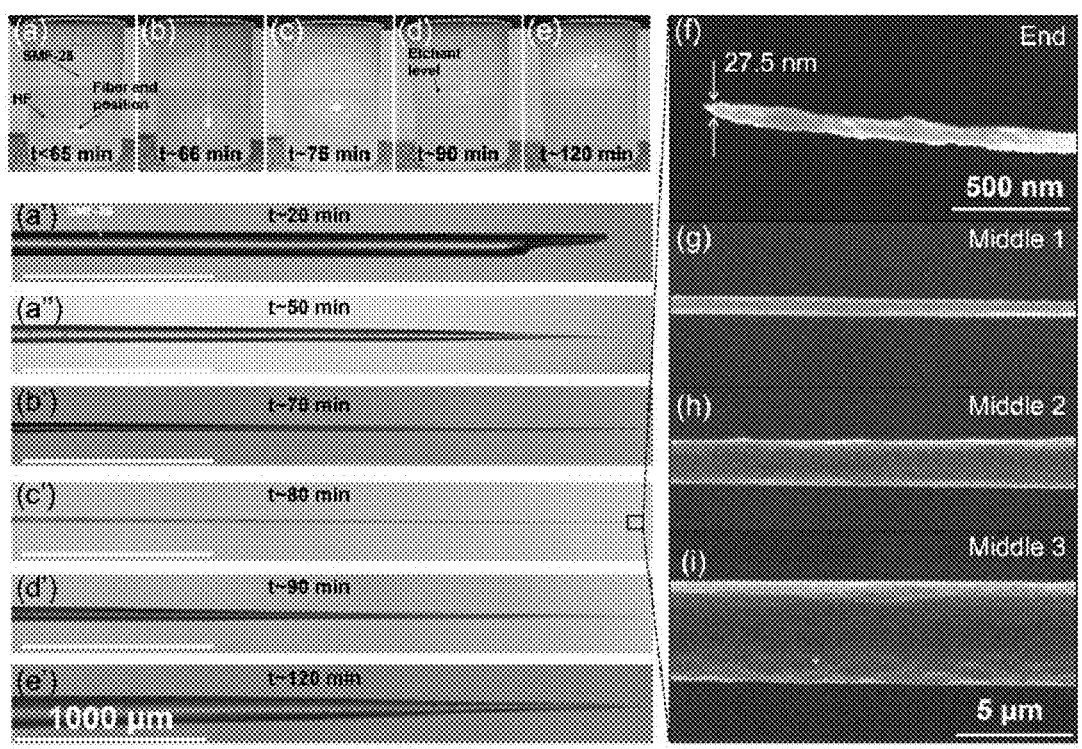
FIG. 7 shows an OFT manufactured according to an OFT manufacturing method according to an embodiment of the present disclosure.

FIG. 7 shows an OFT manufactured according to an OFT manufacturing method according to an embodiment of the present disclosure.

As shown in FIG. 7, it may be seen that the most optimal result is obtained at 75 minutes by using a condition according to FIG. 6 as shown in FIG. 7(c'). When enlarging the result, it may be seen that it has a diameter of about 50 times smaller than a wavelength and the manufactured product is very sharp.

In addition, if the etching time is insufficient or too long based on 75 minutes, it may be seen that the manufactured product is obtuse like a manufactured product corresponding to each of FIGS. 7(a'), 7(b'), 7(d'), and 7(e').

Figure 8:
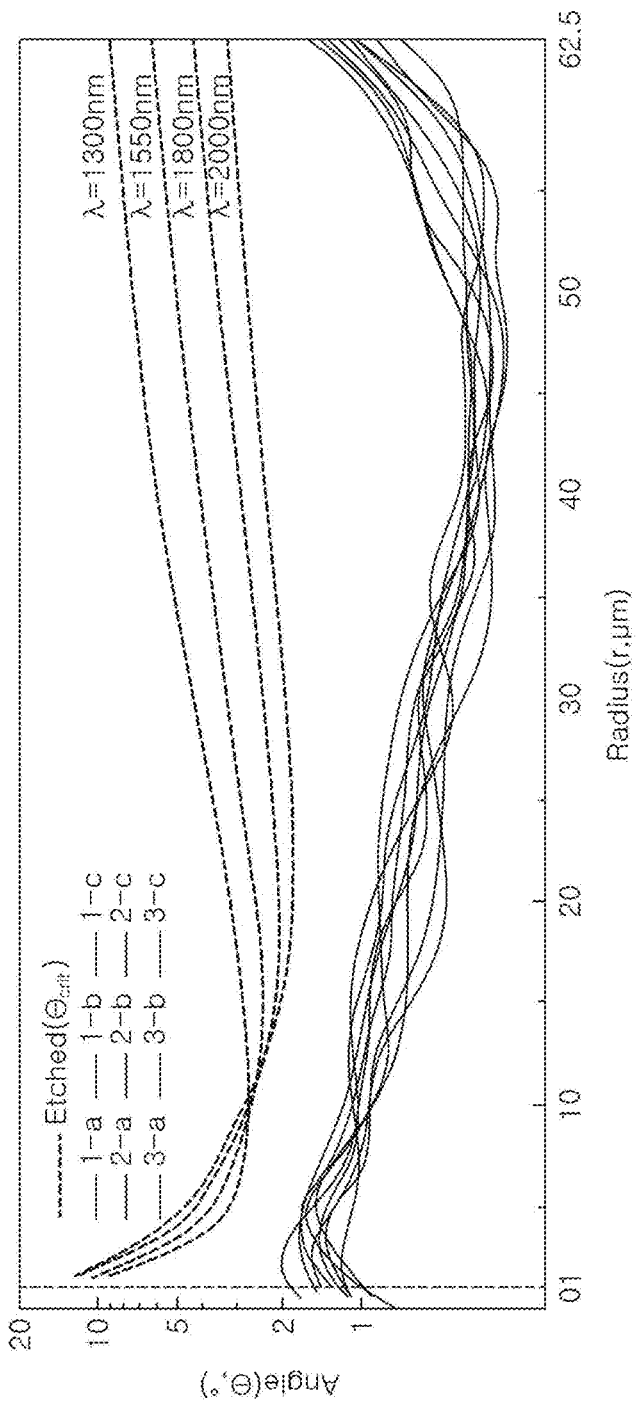
FIG. 8 shows a diagram for identifying reproducibility for each wavelength of an OFT manufactured according to an OFT manufacturing method according to an embodiment of the present disclosure.
Figure 11A:
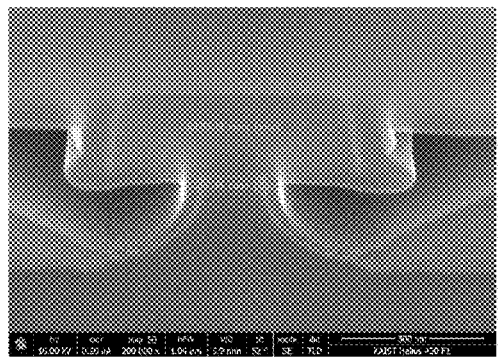
FIGS. 11A, 11B, 11C and 11D show diagrams illustrating a wet etching method of an interface for optical communication and a side of a coupler thereof according to an embodiment of the present disclosure.
Figure 11B:
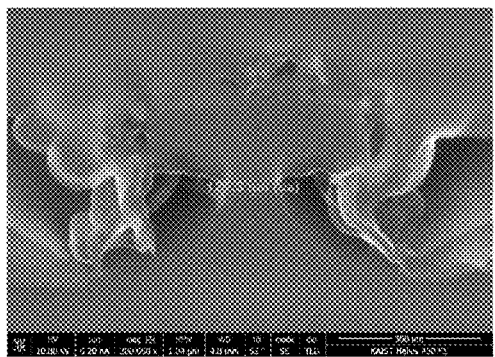
Figure 11C:
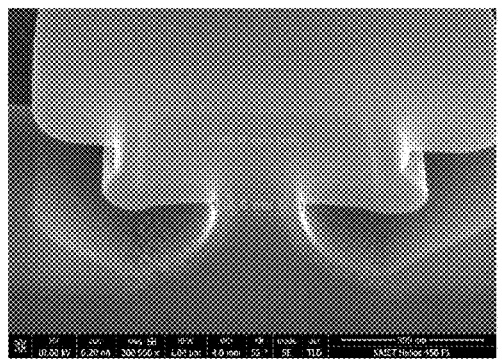
Figure 11D:
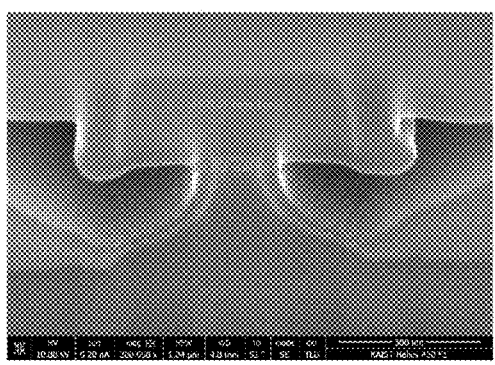

FIG. 8 shows a diagram for identifying reproducibility for each wavelength of an OFT manufactured according to an OFT manufacturing method according to an embodiment of the present disclosure.

FIG. 8 shows a result of manufacturing an optical fiber and identifying the reproducibility, in which nine optical fiber strands are manufactured by dividing into three groups to examine the manufactured product of the OFT.

All of groups 1, 2, and 3 were etched for about 75 minutes, and it may be seen that the results are very reproducible.

In addition, it may be seen that all of them are adiabatic in the wavelength range of 1300 to 2000 nm through the graph in which the results are positioned below the critical angle.

FIG. 9 shows a diagram illustrating a manufacturing process of the interface 10 for optical communication according to an embodiment of the present disclosure.

Since there is a large difference in a refractive index of about 60% between a silica fiber and a silicon waveguide, the silicon waveguide may exist as a BOX and an upper cladding, or a BOX, or an air cladding.

When plotting an index of a fundamental mode according to a width of the silicon waveguide, a lower limit of the refractive index becomes similar to a value of 1.45 of the silica fiber due to the BOX and the upper cladding.

On the other hand, in the case of the air cladding, the refractive index may be significantly reduced by reducing the diameter.

If there is the BOX, it is stable, but an intermediate channel such as a polymer may be used between the OFT and the silicon waveguide. Accordingly, the silicon waveguide may be manufactured in a form that floats in the air.

Accordingly, in order to manufacture the silicon waveguide/taper floating in the air to efficiently transmit the light from the manufactured OFT to the silicon waveguide, a manufacturing process is performed as shown in FIGS. 9A to 9F.

FIGS. 9A to 9E show cross-sectional views illustrating a manufacturing process of a general silicon-based passive device.

First, a passive SOI wafer manufactured by a photo process may be floated in the air through a post process of chemical wet-etching. In this case, not only refractive index matching with the OFT but also a mode of the light may be strongly collected in the silicon taper and the waveguide.

Thereafter, when a silicon waveguide chip is etched for about 6 to 7 minutes by using 6:1 BOE, it shows a shape close to the shape floating in the air as shown in FIG. 9F. Through this, when performing coupling between the OFT and the silicon waveguide, a possibility of light leakage into under the BOX layer 310 may be reduced.

FIGS. 10A, 10B and 10C show diagrams illustrating a front view and a side view of the BOX layer 310 of the interface 10 for optical communication according to an embodiment of the present disclosure.

When performing coupling by using the manufactured OFT and a silicon-based integrated waveguide coupler, a result may be obtained as shown in FIGS. 10A, 10B and 10C. FIGS. 10A, 10B and 10C show a cross-sectional view and a side view of the silicon integrated waveguide, and $W_{WG}$ is a width of the BOX layer 310 under the silicon waveguide. The result as shown in FIG. 15 below may be obtained when simulating by considering above description. Through a measurement result, it may be seen that the excess loss is 1.5 dB in the C-band of 1525 nm to 1570 nm.

Figure 12A:
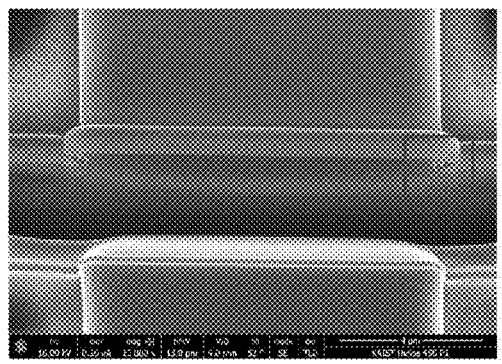
FIGS. 12A, 12B and 12C show diagrams illustrating a wet etching method of an interface for optical communication and a side of a coupler thereof according to an embodiment of the present disclosure.
Figure 12B:
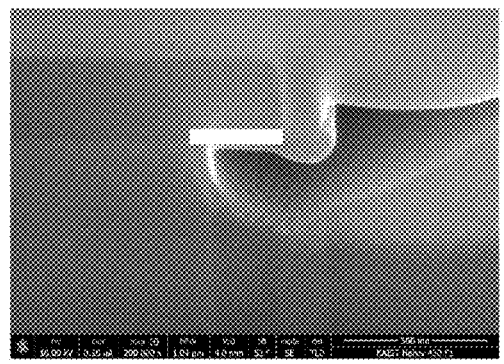
Figure 12C:
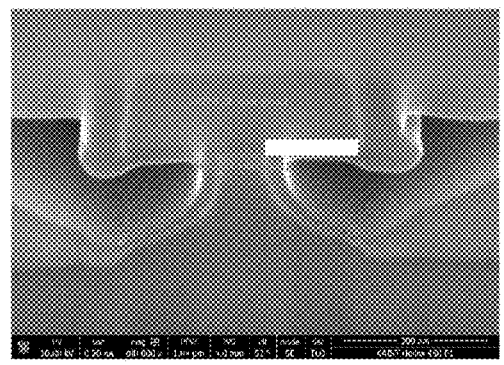

FIGS. 11 and 12 show diagrams illustrating a wet etching method of the interface 10 for optical communication and a side of a coupler thereof according to an embodiment of the present disclosure.

FIGS. 13 to 15 show diagrams illustrating results of a simulation to predict an OFT of the interface 10 for optical communication and an interface of a PIC according to an embodiment of the present disclosure.

Figure 13A:
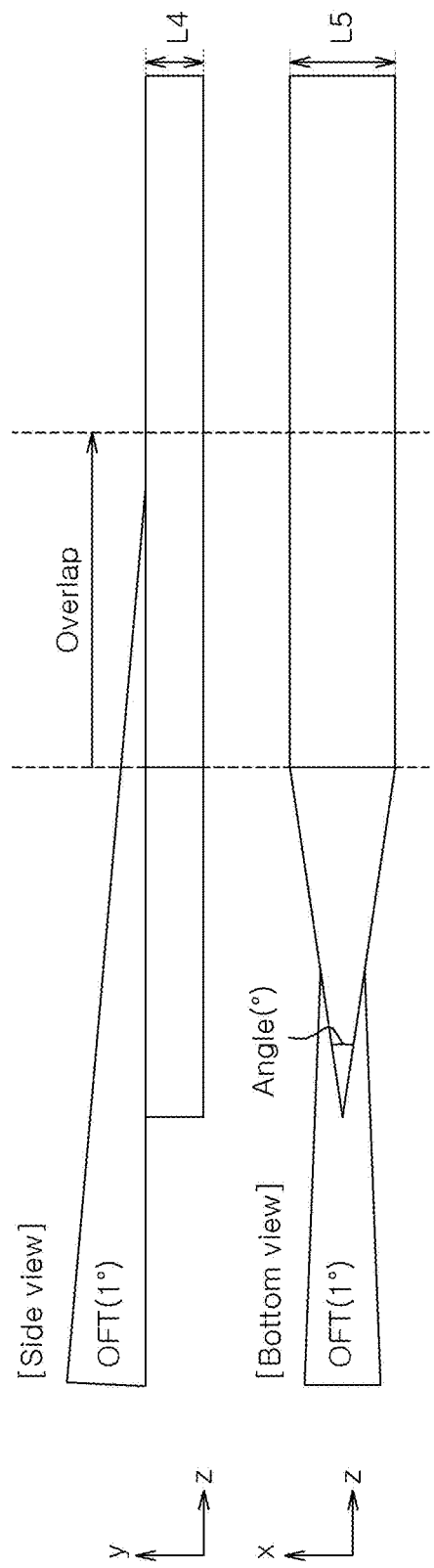
FIG. 13A shows a diagram illustrating a result of a simulation to predict an OFT of an interface for optical communication and an interface of a Photonics Integrated Circuit (PIC) according to an embodiment of the present disclosure.
Figure 13B:
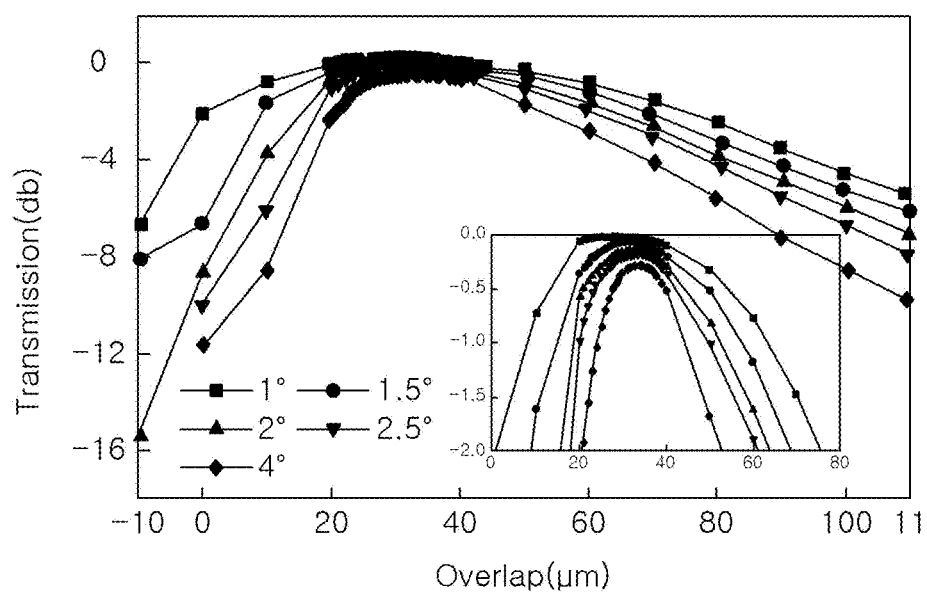
FIG. 13B shows a diagram illustrating a result of a simulation to predict an OFT of an interface for optical communication and an interface of a Photonics Integrated Circuit (PIC) according to an embodiment of the present disclosure.
Figure 13C:
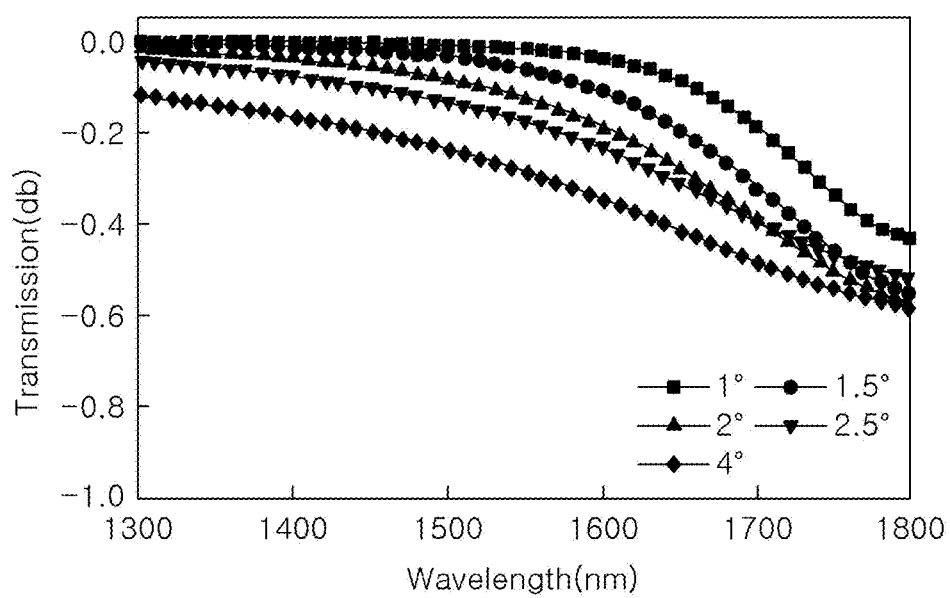
FIG. 13C shows a diagram illustrating a result of a simulation to predict an OFT of an interface for optical communication and an interface of a Photonics Integrated Circuit (PIC) according to an embodiment of the present disclosure.

FIGS. 13A, 13B and 13C show a diagram illustrating a result of attempting optical coupling to a silicon waveguide.

After manufacturing the adiabatic OFT and verifying a property thereof, optical coupling is attempted to the silicon waveguide as shown in FIGS. 13A, 13B and 13C by using this. As shown in the [side view] of FIG. 13A, an OFT having a critical angle of about 1° is simulated, and a silicon waveguide having a height L4 of 210 nm to 230 nm is prepared. In an embodiment of the present disclosure, the most commonly used thickness of a silicon-on-insulator (SOI) wafer of 220 nm is used, and as shown in the [bottom view] of FIG. 13A, a width L5 of the silicon waveguide is simulated as 450 nm to 550 nm.

The analysis according to an overlap length between the OFT and the silicon waveguide, which are dielectric waveguides, is performed. At the same time, the analysis of the angle is also performed in consideration of a process error of the silicon waveguide.

As shown in FIG. 13B, light efficiency drops sharply regardless of a silicon angle at an overlap length less than about 20 μm, and it may be seen that a light transmission rate also drops if the overlap length is longer than about 60 μm. This simulation is conducted through Lumerical company's MODE—mode expansion (EME solver) and a scattering coefficient (S-parameter) value between $HE_{11}$ mode that is the most fundamental mode of the OFT, and $TE_{00}$ mode that is the most fundamental mode of the silicon waveguide is used. If the critical angle of the silicon waveguide is 1°, an 1 dB excess loss area has the overlap length of about 60 μm, showing a high allowable error compared to existing various coupler methods such as an end-fire coupler method and a grating coupler method, etc. It may be expected that the sharper the critical angle of the silicon waveguide is, the greater a length of the allowable error for 1 dB excess loss is, and even if the critical angle is 4°, the loss is less than 0.4 dB, showing very high efficiency.

In order to identify a broadband wavelength property, optical efficiencies from 1300 nm to 1800 nm beyond an O-band and a C-band was identified. This was also simulated by using the $HE_{11}$ mode of the OFT and the $TE_{00}$ mode of the silicon waveguide, and by using the scattering coefficient of the EME solver. Simulation conditions were set to have a silicon critical angle of about 2° and the overlap length of about 33 μm, and it may be seen that the results were identified to show high efficiency in both the O-band as well as the C-band as shown in FIG. 13C, and show a great broadband. Since an optical coupling of the OFT and the silicon waveguides is not a coupling method that uses an accurate phase of the wavelength, a result of the broadband coupling efficiency may be obtained, showing an allowable error not only of a high dimension in space but also of the wideband operating wavelength range.

FIGS. 14A and 14B show a result of measuring light transmission between two waveguides.

As shown in FIG. 14B, the silicon waveguide and the OFT are aligned and the overlap length is about 115 um. In this case, it may be seen that the silicon waveguide takes a suspended form and the taper is well defined.

Figure 15A:
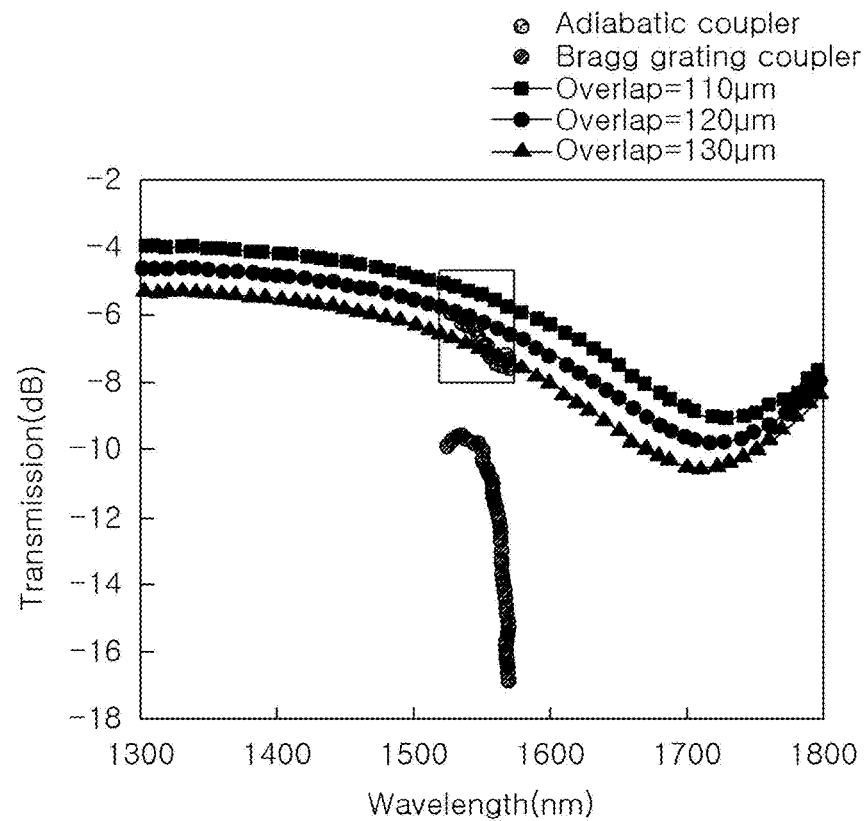
FIG. 15A shows a diagram illustrating a result of a simulation and a result of an experiment to predict an OFT of an interface for optical communication and an interface of a PIC according to an embodiment of the present disclosure.
Figure 15B:
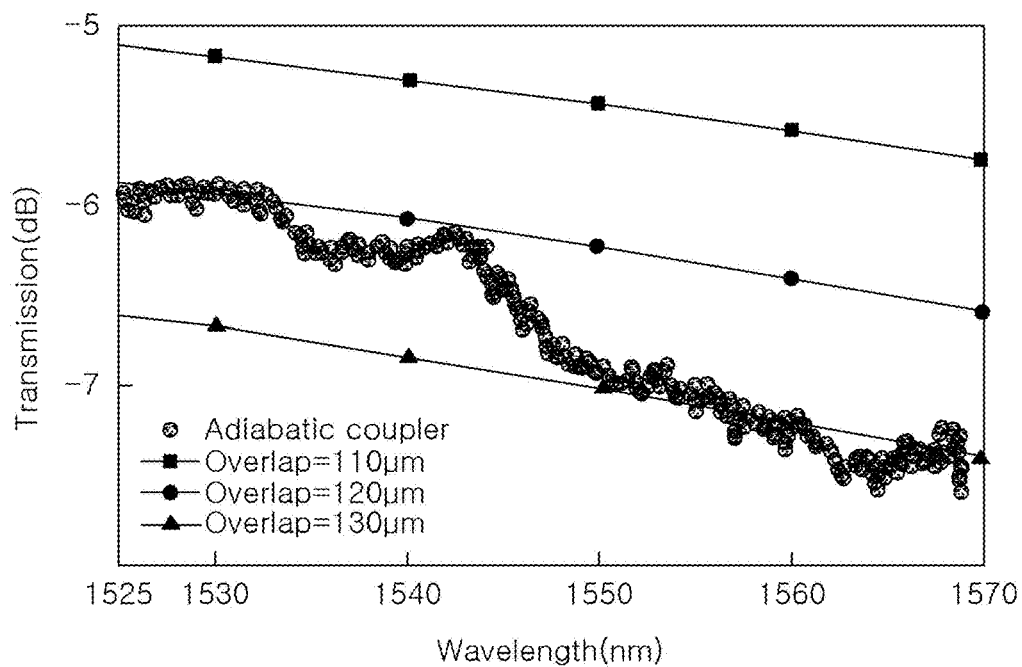
FIG. 15B shows a diagram illustrating a result of a simulation and a result of an experiment to predict an OFT of an interface for optical communication and an interface of a PIC according to an embodiment of the present disclosure.

In addition, as shown in FIGS. 15A and 15B, it may be seen that a measurement result shows about 6 dB to 7.5 dB within the C-band and the excess loss is less than 1.8 dB when the overlap length is 110 um. It may be seen from that the measurement result is same as the simulation result that the waveguide loss by the process is low.

Accordingly, since the manufactured OFT not only has the excellent adiabatic property but also meets an adiabatic condition even if a plurality of OFTs are manufactured at the same time, it may be said that the manufactured OFT shows a great advantage in mass production.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. An interface for optical communication, comprising:
    an input waveguide in which light input from an outside is guided;
    an output waveguide including a first part abutting against one end of the input waveguide and a second part connected to the first part; and
    a substrate including a Buried oxide (BOX) layer connected to a lower side of the output waveguide,
    wherein the one end of the input waveguide includes a tapered structure of which a cross-sectional area is reduced by a predetermined angle,
    wherein a width of the BOX layer is formed to be narrower than a width of the output waveguide.

2. The interface for optical communication of claim 1, wherein the one end of the input waveguide includes a conic structure.

3. The interface for optical communication of claim 1, wherein a cross-sectional area of the first part increases along a waveguide direction of the light transmitted from the input waveguide, and
    a cross-sectional area of the second part is constant along the waveguide direction of the light transmitted from the input waveguide.

4. The interface for optical communication of claim 1, wherein the one end of the input waveguide is disposed to cover at least a part of the output waveguide, so that the input waveguide and the output waveguide form an adiabatic coupling.

5. The interface for optical communication of claim 1, wherein at least a part of the output is formed by a material including silicon.

6. A method of manufacturing an optical fiber taper (OFT), the method comprising:
    immersing an optical fiber including a core and a cladding of which an outside is covered with a polymer jacket into a solution including hydrofluoric acid (HF); and
    removing the optical fiber from the solution after a predetermined time,
    wherein an end of the optical fiber removed from the solution after the predetermined time includes a conic structure of which a cross-sectional area is reduced by a predetermined angle,
    wherein the predetermined time is 70 to 75 minutes.

7. The method of claim 6, wherein the solution including the HF have a concentration of 40% to 50%.

* * * * *